US008264478B2

(12) United States Patent
Kim

(10) Patent No.: US 8,264,478 B2
(45) Date of Patent: Sep. 11, 2012

(54) LIQUID CRYSTAL DISPLAY AND CONTROL METHOD FOR CHARGING SUBPIXELS THEREOF

(75) Inventor: Dong-gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 801 days.

(21) Appl. No.: 12/174,089

(22) Filed: Jul. 16, 2008

(65) Prior Publication Data

US 2009/0174649 A1 Jul. 9, 2009

(30) Foreign Application Priority Data

Jan. 8, 2008 (KR) ........................ 10-2008-0002303

(51) Int. Cl.
*G06F 3/038* (2006.01)
*G09G 5/00* (2006.01)

(52) U.S. Cl. .......................................... 345/204; 345/98

(58) Field of Classification Search .................... 345/98, 345/204
See application file for complete search history.

(56) References Cited

U.S. PATENT DOCUMENTS

2003/0090450 A1* 5/2003 Inada et al. .................... 345/87
2004/0145581 A1* 7/2004 Morita .......................... 345/204
2004/0150599 A1* 8/2004 Morita .......................... 345/87
2006/0221701 A1 10/2006 Sun
2006/0250332 A1* 11/2006 Lo et al. ......................... 345/76
2006/0262130 A1* 11/2006 Kim et al. ..................... 345/589

FOREIGN PATENT DOCUMENTS

JP 2004-037498 2/2004
JP 2004-309949 11/2004
JP 2006-235357 9/2006
JP 2007-041229 2/2007
KR 10-0367010 12/2002
KR 10-0603456 7/2006
KR 2006-0124085 12/2006

* cited by examiner

*Primary Examiner* — Chanh Nguyen
*Assistant Examiner* — Kwang-Su Yang
(74) *Attorney, Agent, or Firm* — Innovation Counsel LLP

(57) ABSTRACT

A demultiplexer is provided within a liquid crystal display (LCD) to transfer respective data levels of a time multiplexed data signal to respective sub-pixels within a pixel group. The last of sequentially activated switches in the demultiplexer is activated for the longest time so as to provide sufficient time for charge to transfer from the demultiplexer to a subsidiary data line (SDL) of the last supplied sub-pixel and from that last SDL through a respective TFT of the last sub-pixel to the last supplied sub-pixel.

11 Claims, 4 Drawing Sheets

LIQUID CRYSTAL DISPLAY AND CONTROL METHOD FOR CHARGING SUBPIXELS THEREOF

CROSS-REFERENCE TO RELATED APPLICATIONS

This application claims priority from Korean Patent Application No. 10-2008-0002303, filed on Jan. 8, 2008 in the Korean Intellectual Property Office, the disclosure of which is incorporated herein by reference.

BACKGROUND

1. Field of Invention

Apparatuses and methods consistent with the present disclosure of invention relate to a liquid crystal display (LCD) and a control method thereof, and more particularly to a liquid crystal display having a demultiplexer to control the output of a data signal and a control method therefor.

2. Description of Related Technology

In general, a liquid crystal display (LCD) generates an electric field in a liquid crystal layer disposed between two display substrates. The LCD adjusts the intensity of an electric field in each of plural pixel areas to regulate the transmittance of light passing through the liquid crystal layer of those pixel areas, thereby displaying a desired image.

The typical LCD includes a display panel where a plurality of pixel units and corresponding signal lines are provided, the latter being used to transmit signals to the pixel units. The typical LCD further includes a gate driver to output respective gate signals to gate ones of the signal lines, a data driver to output respective data signals to data ones of the signal lines, and a controller to control the drivers. When each of the pixel units is supplied with a respective data signal while being simultaneously supplied with an activating gate signal ($V_{gON}$), a pixel-electrode of the pixel unit is charged with a voltage corresponding to the data signal and a desired electric field is then formed between the pixel-electrode and an opposed common electrode.

In one class of embodiments, each of plural main pixel units is subdivided into a plurality of sub-pixels where the latter may be respectively driven by different data signal levels. In such a case, the data driver may include a plurality of data driving chips. Each of the data driving chips and a corresponding plurality of sub-pixels in one main-pixel area are connected through a shared data line (a time multiplexed line) to each other. In other words, in order to decrease the number of data driving chips used per sub-pixel, in one embodiment, each output terminal of each of the data driving chips is connected via a shared data line (that operates on the basis of time multiplexing) with a plurality of individual data lines (also referred to herein as subsidiary or source data lines or SDL's). The LCD further includes a demultiplexer with a 1:n demultiplexer system so that different data signal levels can be sequentially output to a plurality of individual data lines (SDL's) connected via the 1:n demultiplexer to a time shared one output terminal of one data driving chip.

Meanwhile, for the one main-pixel unit, i.e., a plurality of sub-pixels (e.g., R, G, B) are turned on by one activating gate signal at the same time. However, as a time-varying data signal levels are sequentially applied to the sub-pixels, the last sub-pixel in the sequence may not be sufficiently charged due to one or more RC time constant limitations that are imposed on transferring charge from a shared data line to an individual data line (an SDL and its associated parasitic capacitance) and then through the sub-pixel's TFT to the pixel-electrode capacitance of that sub-pixel. In other words, a plurality of data signal levels are sequentially applied one after the other during a time period corresponding to one gate-on time. However, because the last sub-pixel in the sequence is being charged as the gate line and shared data line are being deactivated, the last sub-pixel (and its associated RC effective circuitry) does not have as long of a time to receive charge from the corresponding shared data line as do the previously driven sub-pixels. As a result, insufficient charging (or discharging) of the last pixel-electrode may occur.

SUMMARY

According to an aspect of the present disclosure of invention, an LCD which has a plurality of sub-pixels in one pixel group is supplied with a time-varying data signal whose tail level persists for a sufficient period of time so as to provide a uniform charge-transfer time interval even for the last charged one of a plurality of sequentially charged sub-pixels.

Another aspect of the present disclosure is to provide an LCD where the last sub-pixel of a plurality of sequentially driven sub-pixels is supplied with a data signal level during a predetermined period of time so that all pixels are charged to respective data signal levels during a sufficient period of time.

Additional aspects of the present disclosure will become apparent in the detailed description which follows.

The foregoing and/or other aspects of the present disclosure can be achieved by providing a liquid crystal display comprising: a display panel where a main pixel group including a plurality of sub-pixels arranged in one direction is formed; a gate driver to output a gate signal; a data driver to output a data signal; a driven shared data line of which an end portion is electrically connected to the data driver; a demultiplexer including a switch of which one end portion is electrically connected to the shared driven data line and the other end portion is electrically connected to a source data lines (SDL) of a corresponding set of sub-pixels to thereby sequentially supply data signal levels to the sub-pixels; and a controller controlling the demultiplexer to turn on a switch connected to a sub-pixel source data line (SDL) where a data signal level of a last of the sequentially driven sub-pixels is finally applied during a longest period of available charging time.

According to one embodiment, the controller controls the gate signal to be output to the pixel during the period of charging time.

According to one embodiment, the gate driver comprises a shift register formed on the display panel, and the shift register comprises a thin film transistor of low-temperature polycrystalline silicon (LTPS).

According to one embodiment, the switch comprises low-temperature polycrystalline silicon (LTPS).

According to one embodiment, each sub-pixel unit comprises a thin film transistor (TFT) including amorphous silicon.

According to one embodiment, a main pixel unit comprises a first sub-pixel, a second sub-pixel, and a third sub-pixel.

A control method in accordance with the disclosure is provided for a liquid crystal display which comprises a main pixel group including a plurality of sub-pixels whose source data lines (SDL's) are sequentially driven one after the next, a gate driver to output a gate signal, a data driver to output a time varying data signal, and a switch connected with the data driver and to the source data line of corresponding sub-pixels, the method comprising: sequentially applying levels of a time varying data signal to the source data lines of respective sub-pixels; and controlling a switch connected to a last sub-pixel so that the data signal level which is finally applied to the last sub-pixel is given a longest charge transfer time.

According to one embodiment, the main pixel group comprises a first sub-pixel, a second sub-pixel, and a third sub-pixel arranged in one direction, and a period of time where the corresponding data signal level is applied to the source data line (SDL1) of the first sub-pixel and to the source data line (SDL2) of the second sub-pixel is shorter than the period of charging time allocated for the source data line (SDL3) of the last sub-pixel.

According to one embodiment, the method further includes controlling the gate driver to output the activating gate signal ($V_{gON}$) to the sub-pixels during the charging time of the last sub-pixel.

BRIEF DESCRIPTION OF DRAWINGS

The above and/or other aspects of the present disclosure will become apparent and more readily appreciated from the following description of the exemplary embodiments, taken in conjunction with the accompanying drawings, in which.

DETAILED DESCRIPTION

Figure 1:
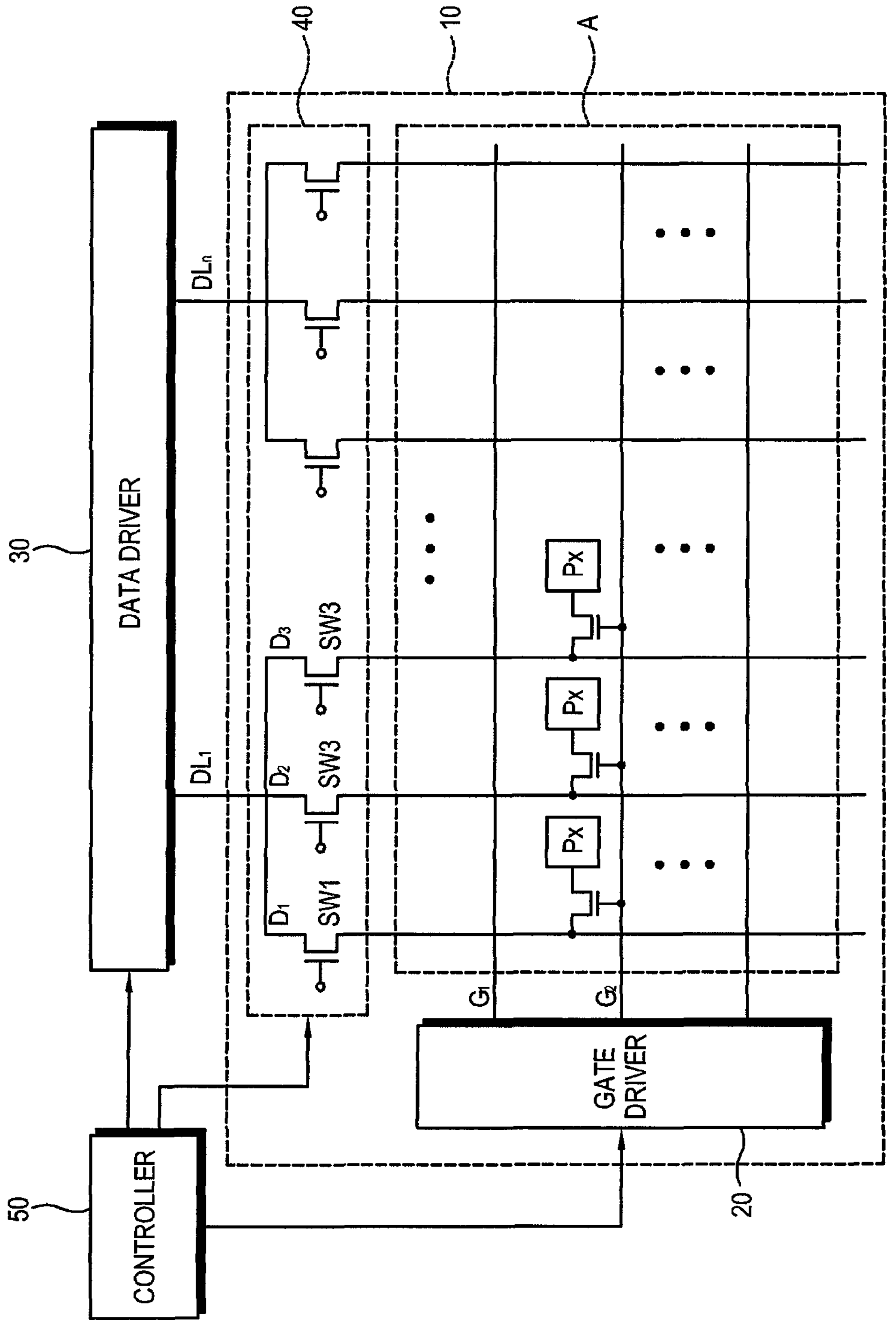
FIG. 1 is a control block diagram of an LCD according to an exemplary embodiment.

Reference will now be made in detail to an exemplary embodiment in accordance with the present disclosure and examples thereof which are illustrated in the accompanying drawings, wherein like reference numerals refer to like elements throughout.

Figure 2:
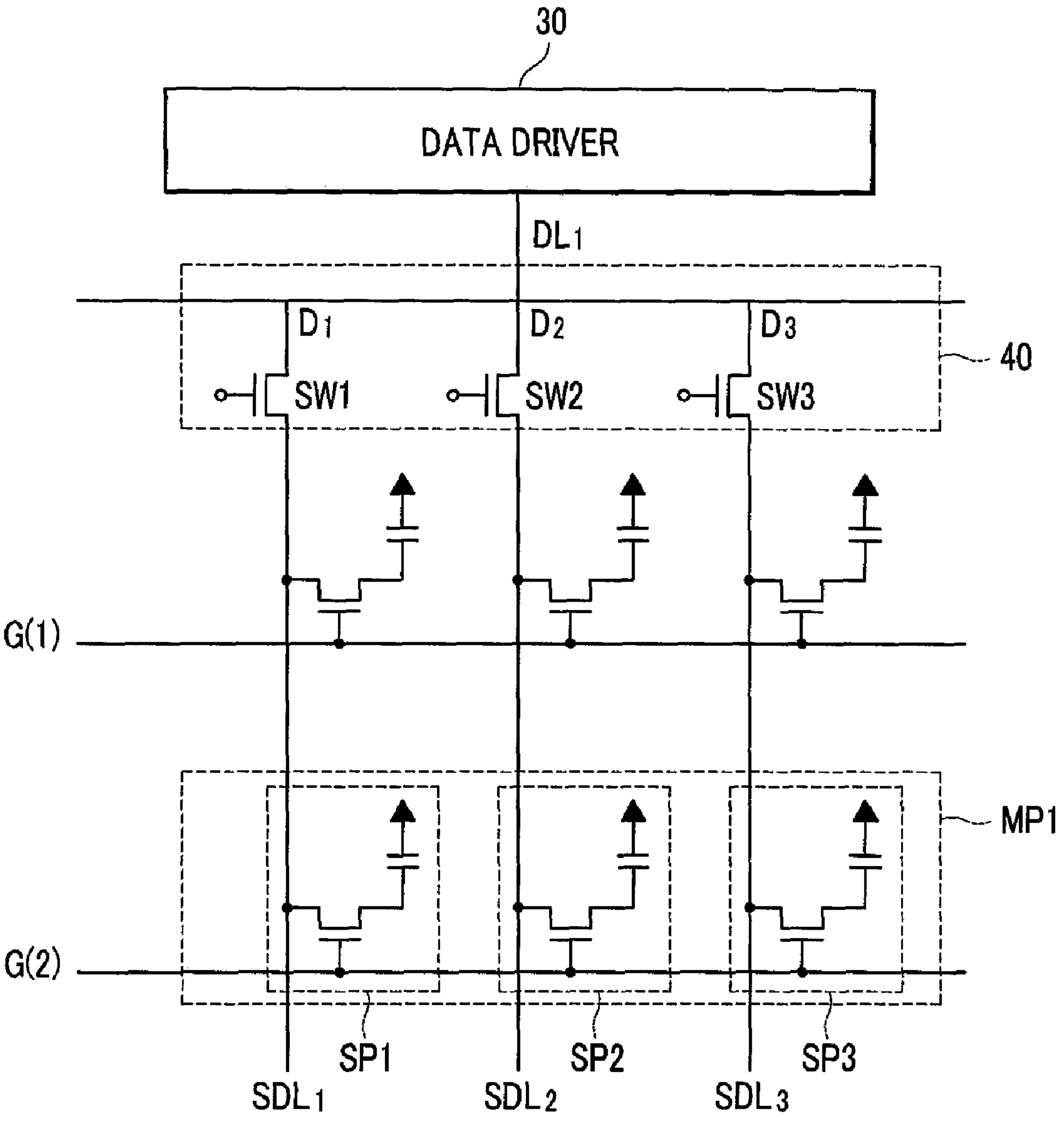
FIG. 2 is a circuit diagram to illustrate a pixel group of the LCD according to the exemplary embodiment of FIG. 1.

FIGS. 1 and 2 are respectively a control block diagram and more detailed schematic of an LCD according to an exemplary embodiment. The LCD includes a display panel 10, a data driver 30, a gate driver 20, a demultiplexer 40, and a controller 50.

The display panel 10 according to the present exemplary embodiment includes a plurality of pixel groups (MP1, MP2, etc.) arranged in a matrix form in a display region (A) where an image is displayed. Each of the pixel groups includes a plurality of sub-pixels (SP1, SP2, and SP3). Each of the sub-pixels (SP1, SP2, and SP3) may include a respective thin film transistor (TFT) such as one made with amorphous silicon and having source, drain and gate terminals with the drain terminals being coupled to a corresponding pixel-electrode and the source terminals being coupled to a corresponding source data line (SDL1, SDL2, SDL3). The gate-to-source capacitance of each of the TFT's along a given subsidiary data line (e.g., SDL1, SDL2, SDL3) contributes to the summed parasitic capacitance of that subsidiary data line.

Each pixel group (e.g., MP1 of FIG. 2) on the display panel 10 is connected to the data driver 30 and gate driver 20 through a plurality of signal lines. The signal lines include a plurality of gate lines (G1, G2, etc.) to transmit respective gate signals (also referred to as 'scan signals') and a plurality of driven data lines (DL1, . . . , DLn) to transmit respective data signal levels through corresponding demultiplexers (40) and from there to corresponding pluralities of subsidiary data lines (SDL1, SDL2, SDL3, . . . ). The gate lines (G1, G2, etc.) extend in the row direction and are substantially parallel with each other. The subsidiary data lines (SDL1, . . . , SDLn) extend in the column direction and are substantially parallel with each other. The display panel 10 displays an image on the basis of data signal levels (D1, D2, D3, etc.) applied from the data driver 30 and gate signals (G1, G2, etc.) applied from the gate driver 20.

Each of the main pixel groups (MP1, MP2, etc.) on the illustrated display panel 10 includes a first sub-pixel (SP1), a second sub-pixel (SP2), and a third sub-pixel (SP3). (In an alternate embodiment, each main pixel group may have just two sub-pixels or more than three sub-pixels.)

The gate driver 20 is connected to the gate lines (G1, G2, etc.) on the display panel 10 to apply a gate signal. The gate signal is formed of the combination of a gate-on voltage level ($V_{Gon}$) and a gate-off voltage level ($V_{Goff}$). The gate-on voltage ($V_{Gon}$) and gate-off voltage ($V_{Goff}$) may be applied from a voltage generating unit (not shown) that converts a gate control input voltage applied from the outside to a different voltage level. In one embodiment, the gate driver 20 is substantially provided as a shift register and includes a plurality of stages connected to the respective gate lines (G1, G2, etc.). In one embodiment, the stages are formed directly on the display panel 10 and include a plurality of thin film transistors. The thin film transistors may be formed of low-temperature polycrystalline silicon (LTPS) to enhance mobility unlike the thin film transistor in the display region (A).

The gate driver 20 sequentially outputs an activating gate signal pulse to the gate lines (G1, G2, etc.) on the display panel 10 one after the other. The gate driver 20 outputs a gate signal on the basis of a synchronization signal from the outside. After all pixel groups in the first row are activated with an activating gate signal pulse, the gate driver 20 outputs a second gate signal pulse to pixel groups in the second row and so on.

The data driver 30 is connected with the driven data lines (DL1, . . . , DLn) on the display panel 10 to apply a time-varying data signal (having sequential levels, D1, D2, D3, etc.). The data signal (D1, D2, D3, etc.) is provided as a time-varying grayscale voltage (e.g., analog signal) to output a brightness level of each of the sub-pixels (SP1, SP2, and SP3) according to an image signal input from the outside. In the illustrated embodiment, the data driver 30 applies grayscale voltages corresponding to the respective sub-pixels (SP1, SP2, and SP3) as data signal levels D1, D2, and D3.

The data driver 30 sequentially supplies the data signal levels (D1, D2, and D3) to the driven data lines (DL) on the display panel 10. The first to third data level signals (D1, D2, and D3) output from the data driver 30 each are applied to the sub-pixels (SP1, SP2, and SP3) in the first pixel group (MP1) of a first display row through the first data line (DL1) by way of time-division multiplexing. Fourth to sixth data signal levels (not shown) are similarly applied to sub-pixels in a second main pixel group (not shown) of the first display row through the second driven data line (DL2, not shown) and so on.

The demultiplexer 40 is positioned between the data driver 30 and the source data lines (SDL1, SDL2, etc.) that connect to the respective sub-pixels (SP1, SP2, etc.) of the display panel 10 by way of their respective TFT's. The demultiplexer 40 has the same number of switches (SW1, SW2, etc.) as the number of sub-pixels (SP1, SP2, etc.) per main pixel and the number of subsidiary data lines (SDL1, SDL2, etc.) per driven data line. The switches (SW1, SW2, etc.) may be made of LTPS and formed on the panel substrate along with the sub-pixels.

The data signal levels (D1, D2, etc.) are output according to timing of turning on/off the switches (SW1, SW2, etc.) of the demultiplexer 40. The data signal levels (D1, D2, and D3) applied to the first driven data line (DL1) are sequentially output to the respective source data lines (SDL1, SDL2, SDL3) of the sub-pixels (SP1, SP2, and SP3) in the first pixel group (MP1) according to turning on/off of the switches (SW1, SW2, and SW3). That is, the first data signal level (D1) is applied to the first source data line (SDL1, and its associated parasitic capacitance) of the first sub-pixel (SP1) in the first main pixel (MP1); and the second data signal level (D2) to the second source data line (SDL2) of the second sub-pixel (SP2) in the first main pixel (MP1) and so on. Here, the demultiplexer 40 sequentially turns on/off the switches (SW1, SW2, and SW3) at certain intervals under control of the controller 50. The first data signal level (D1) is thus output by the data driver 30 for transfer to the first sub-pixel (SP1) in a first time span between when the first switch (SW1) has been already turned on and before turning on the second switch (SW2). The second data signal level (D2) is output by the data driver 30 for transfer to the second sub-pixel (SP2) between when the second switch (SW2) has been already turned on and before turning on the third switch (SW3) and so on.

The controller 50 controls the display panel 10 to display an image corresponding to an image signal input from the outside and may be provided as a timing controller. The controller 50 is provided with an image signal which has been processed by a graphic processor (not shown) to process an image signal. Here, the controller 50 is also provided with a control signal to control the image signal, such as a synchronization signal, clock signal, etc. The controller 50 enables a data signal and gate signal to be synchronously applied to the display panel 10 on the basis of provided control signals.

The controller 50 controls the gate driver 20 to output a gate-on voltage ($V_{Gon}$) as a first gate signal (G1) to the first row on the display panel 10 according to a synchronization signal. Then, the controller 50 controls the data driver 30 to output the sequential data signal levels (D1, D2, and D3) according to a time-varying grayscale voltage. The data signal levels (D1, D2, and D3) are sequentially applied to the respective sub-pixels (SP1, SP2, and SP3; or more accurately to their respective source data lines, SDL1, SDL2, SDL3) according to turning on/off the switches (SW1, SW2, and SW3) in the demultiplexer 40.

In a conventional display device, switches SW1, SW2, and SW3 are each turned on for a same time interval for respective sub-pixels (SP1, SP2, and SP3) in a main pixel group. For example, when a gate turn-on time during which data signal levels (D1, D2, and D3) are applied to the first main pixel group (MP1) through the first driven data line (DL1) is given as 13.5 μs, the respective data signal levels are applied to the respective source data lines (SDL1, SDL2, SDL3) of the sub-pixels (SP1, SP2, and SP3) for 4.5 μs each, respectively. A first gate signal (G1) is applied to the first sub-pixel (SP1) at the same time as the corresponding data signal is applied to charge the SDL1 source data line to the desired voltage level (D1). The TFT of sub-pixel SP1 remains on for the full 1H period (e.g., 13.5 μs) even though the SW1 demultiplexer switch is turned off after 4.5 μs. Accordingly, the first sub-pixel (SP1) is charged with the data signal stored on the parasitic capacitance (not shown) on its source data line (SDL1) for the full 13.5 μs. However; the second sub-pixel (SP2) is charged by the voltage present on its source data line (SDL2) for only 9 μs; and the third sub-pixel (SP3), for only 4.5 μs. The RC time constants of the turned on TFT's and their corresponding pixel-electrodes may be such that the first and second sub-pixels (SP1 and SP2) are sufficiently charged to the grayscale voltages present on their corresponding source data lines (SDL1, SDL2), but the third sub-pixel (SP3) is not so sufficiently charged to the grayscale voltage present on its corresponding source data line (SDL3).

However, the controller 50 according to the present disclosure controls the demultiplexer 40 to modify the time periods for applying the respective data signal levels (D1, D2, etc.) to the source data lines (SDL1, SDL2, etc.) of the respective sub-pixels (SP1, SP2, etc.). The controller 50 enables a data signal level to be applied to the last in the sequence of charged sub-pixels (e.g., SP3) from its corresponding source data line (e.g., SDL3) for a sufficiently longer time so that even though it is the last to be applied with such a data signal level during the predetermined period of a gate-on duration (typically 1H), it will be sufficiently charged. The predetermined charging time for the last to be charged sub-pixel is at least an empirically determined period during which that last charged sub-pixel is sufficiently charged with a data signal level of its corresponding source data line (e.g., SDL3) and this empirically determined period can vary depending on the kind of liquid crystal molecules used in the LCD, on their response speed, or on other such characteristics of the liquid crystal layer. In other words, the controller 50 controls a switch connected to the third sub-pixel (SP3) to be turned on for a longest one of the charge transfer periods of charging time allocated among SP1, SP2, and SP3, so that the respective sub-pixels (SP1, SP2, and SP3) are each sufficiently charged. In one embodiment, a last sub-pixel charging time of about 5 μs or more out of a 13.5 μs horizontal scan time (1H) has been found to be sufficient even with presence of an intermediate delay time (Dt) for gate cutoff to prevent the overlap with a data signal to be applied to the following main pixel group.

Figure 3:
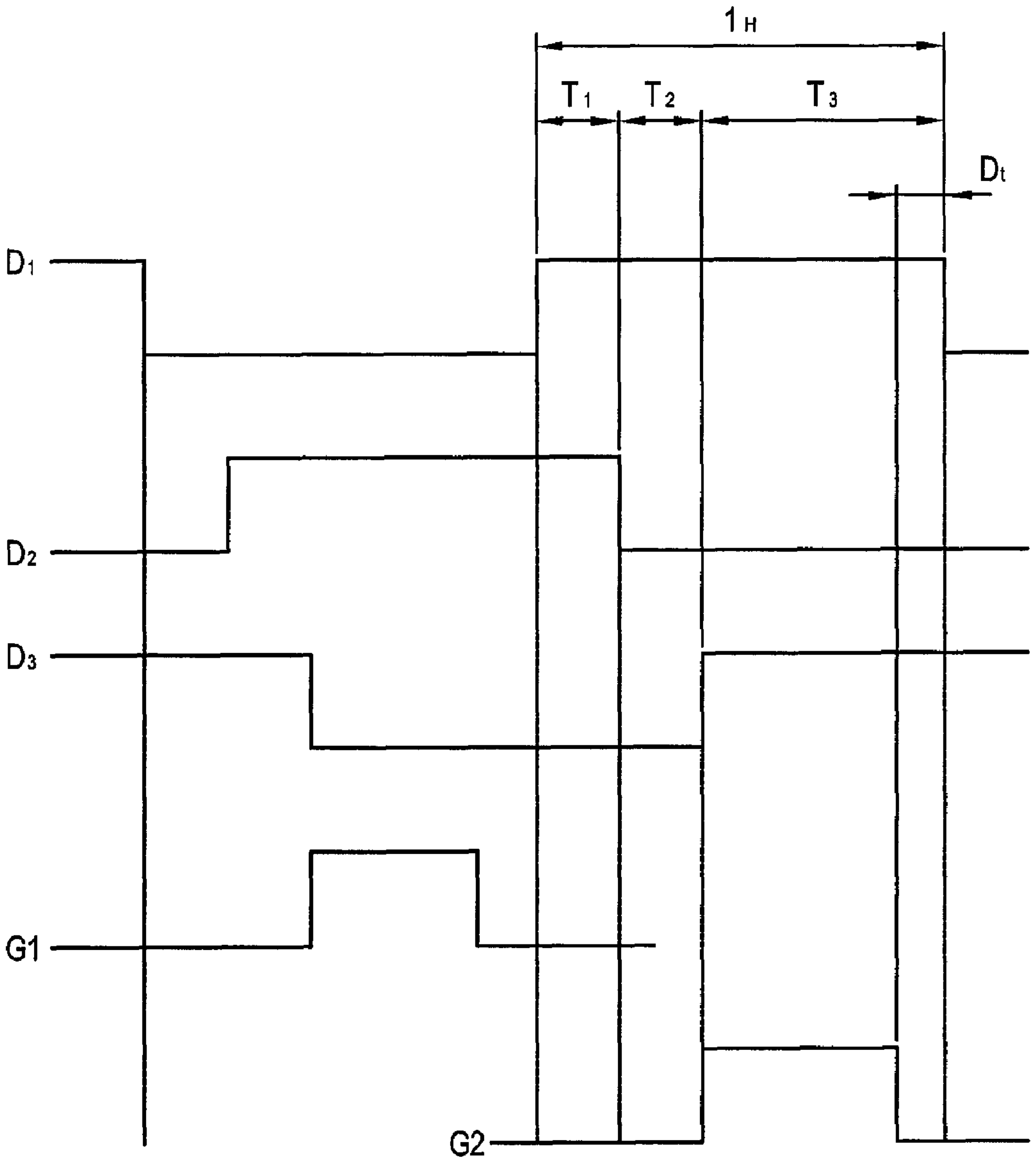
FIG. 3 illustrates a timing diagram during which a data signal and gate signal are applied to one pixel group in the LCD according to the exemplary embodiment of FIGS. 1-2.

Referring to FIG. 3, a total horizontal scan period during which a varying data signal is applied to the first main pixel group (MP1) is 1H. The demultiplexer 40 sequentially turns on and then off each of the switches (SW1, SW2, and SW3) connected to the respective pixels (SP1, SP2, and SP3) in turn so as to sequentially apply the respective data signal levels (D1, D2, and D3) to the corresponding source data lines (SDL1, SDL2, SDL3) of respective sub-pixels (SP1, SP2, and SP3) and thus charge the source data lines to those respective levels (D1, D2, and D3). While G2 is still off (low level), the first switch (SW1) is turned on for a first time interval, T1 so as to thereby apply a first data signal level (D1) to the source data line (SDL1) of the first sub-pixel (SP1)—where in FIG. 2, that source data line is the vertical line below SW1. Still while G2 is off (low level), SW1 is switched to the open state and then the second switch (SW2) is turned on for a second time interval, T2 to thereby apply a second data signal level (D2) to the source data line (SDL2, and its associated parasitic capacitance) of the second sub-pixel (SP2). After the second SW2 is switched to the open state, the third switch (SW3) is turned on for a third time interval, T3 to apply a third data signal level (D3) to the source data line (SDL3) of the third sub-pixel (SP3). Here, the third time interval, T3 is set to be the longest charge transfer time interval among T1, T2 and T3, so that the third sub-pixel (SP3) may be sufficiently charged even if the corresponding gate-on signal (e.g., G2) cuts off prior to the end of the 1H scan period by a delay time margin of duration Dt.

In one embodiment, the controller 50 controls the gate driver 20 to apply the corresponding gate activating signal (e.g., G2=High) to the main pixel (SP1, SP2, and SP3) at the same time as the third data signal level (D3) begins to be applied via demultiplexer switch SW3. In other words, the rising edge of G2 coincides substantially with the leading edge of the corresponding D3 level. Although their subsidiary data lines (SDL1, SDL2) have been pre-charged with the D1 and D2 levels, the first and second sub-pixels (SP1 and SP2) are not respectively charged with the first and second data signal levels (D1 and D2) until the corresponding gate activating signal (e.g., G2=High) is provided. However, when the TFT's of sub-pixels (SP1, SP2, and SP3) are turned on with the corresponding gate signal (e.g., G2) at the same time as the third sub-pixel (SP3) is being supplied with the third data signal level (D3), the charges pre-stored on the respective source data lines (SDL1, SDL2) of the respective first and second sub-pixels (SP1 and SP2) are transferred over to the pixel-electrodes of those sub-pixels (SP1 and SP2) during the same time interval, T3 that level D3 is being transferred over to the pixel-electrode of the third sub-pixel (SP3).

For example, when 1H of the display panel 10 is 13.5 μs and a predetermined charging time of T3=7.5 μs is used (about 56% of the 1H period), the controller 50 enables a data signal to be applied to the third sub-pixel (SP3) for the predetermined charging time of 7.5 μs of 1H. The controller 50 enables respective data signal levels (D1 and D2) to be applied to the source data lines (SDL1, SDL2) of the first and second sub-pixels (SP1, SP2) for 3 μs apiece (about 22% of the 1H period for each). Accordingly, even with a cutoff delay (Dt) of 1.5 μs between when G2 goes low and the 1H period ends, the third sub-pixel (SP3) is charged with the third data signal level (D3) for 6 μs (7.5−1.5=6), which is more than the charging time of 4.5 μs (13.5/3) available in the case of equal time intervals (T1=T2=T3). Accordingly, the third sub-pixel (SP3) can be sufficiently charged through its TFT.

As may be appreciated from FIG. 3, the corresponding gate signal (G2) is applied to the TFT's of the sub-pixels (SP1, SP2, and SP3) at the same time as the third data signal level (D3) begins to be applied, and the respective sub-pixels (SP1, SP2, and SP3) are charged from their respective source data lines (SDL1, SDL2, SDL3) during the same time of T3=6 μs (where 7.5−Dt=6).

Hereinafter, a control method of the LCD according to the present embodiment will be described with reference to the process flow chart of FIG. 4.

Figure 4:
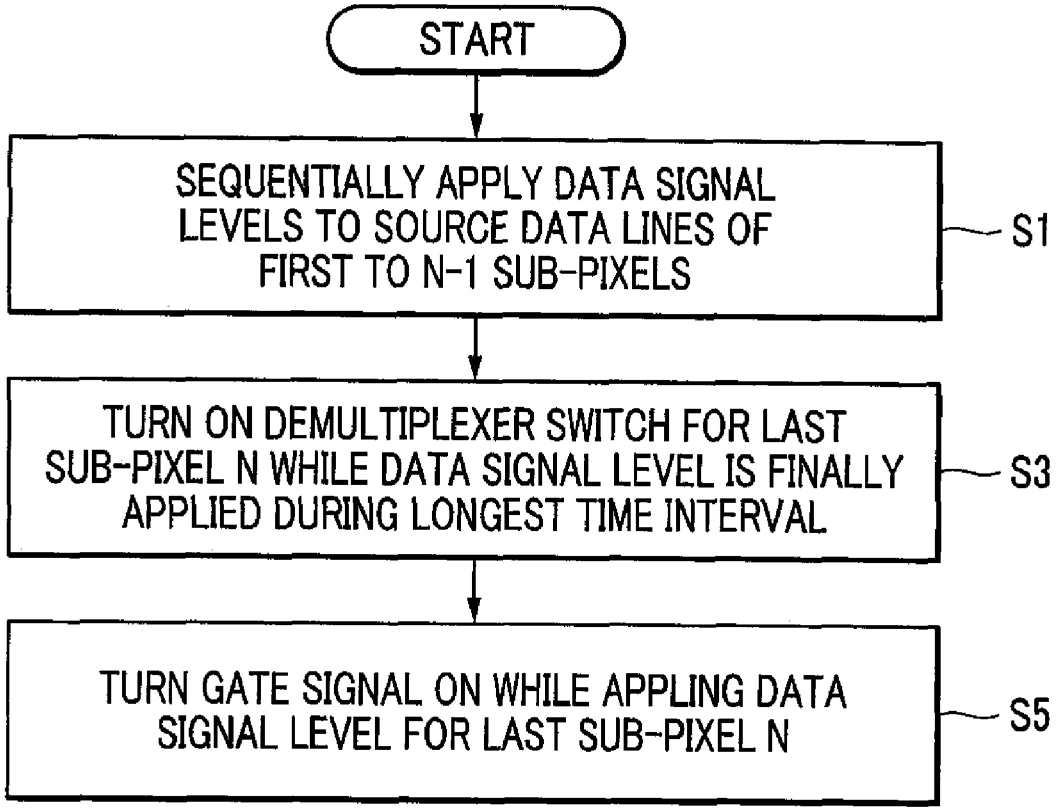
FIG. 4 is a control flowchart to describe a control method of the LCD according to the exemplary embodiment.

As illustrated in FIG. 4, when an image signal is input from the outside, a time-varying data signal (e.g., on driven line DL1) and a corresponding gate signal (e.g., G2 of FIG. 2) are generated.

The controller 50 controls the demultiplexer 40 to sequentially apply the generated data signal levels (D1, D2, D3) to the source data lines (SDL1, SDL2, SDL3) of the corresponding plurality of sub-pixels (step S1). Then, as the demultiplexer 40 turns on a last demultiplexer switch (e.g., SW3) connected to the last sub-pixel among the sequence of sub-pixels so as to apply the last data signal level (e.g., D3) to that last sub-pixel (Step S3), the corresponding gate signal (e.g., G2) is turned on so that the data signal levels of all sequentially driven sub-pixels (e.g., SP1, SP2, SP3) are transferred via their TFT's from the subsidiary data lines (SDL1, SDL2, SDL3) to their respective pixel-electrodes during the longest charging time, T3 (step S5).

As described above, when the last pixel level is supplied during the longest charge transfer time (T3), all sub-pixels in one main pixel group can be sufficiently charged with charge transferred from their respective subsidiary data lines (SDL1, SDL2, SDL3). In one embodiment, a time during which the last data signal level (e.g., D3) is applied may be 5 μs or more besides a margin of safety delay time, Dt.

Consequently, the last sub-pixel of the plurality of sub-pixels is supplied with its corresponding data signal level (e.g., D3) during a predetermined period (T3) of charge transfer time, so that the sub-pixels have a uniform period of charging time. Further, all sub-pixels in one main pixel group are supplied with a corresponding data signal level for a sufficient period of time to be charged sufficiently. Moreover, a gate signal may be applied for all pixels to be charged for an equivalent period of time.

As described above, the present disclosure of invention provides an LCD where the last sub-pixel of a plurality of sequentially driven sub-pixels is applied with a data signal during a predetermined period of time (e.g., T3) so that the sub-pixels have a uniform charge transfer time.

Further, the present disclosure provides an LCD where the last sub-pixel of a plurality of sequentially driven sub-pixels is applied with a data signal level during a predetermined period of time so that all pixels are charged with the data signal during a sufficient period of time for transferring a desired amount of charge to their respective pixel-electrodes.

The present disclosure provides an LCD where a gate signal is applied for all pixels to be charged during the same period of time (T3).

Although an exemplary embodiment has been shown and described, it will be appreciated by those skilled in the art that changes may be made to this embodiment without departing from the principles and spirit of the disclosure.

What is claimed is:

1. A liquid crystal display comprising:

a display panel including a pixel group having a plurality of sub-pixels;

a gate driver structured to output a pulse-shaped gate signal that activates the sub-pixels of the pixel group for a duration of the pulse-shaped gate signal, the activation causing the respective sub-pixels to respond to respective data levels applied to the respective sub-pixels;

a data driver structured to output a time varying data signal having a plurality of data levels;

a shared data line which is electrically connected to the data driver to thereby receive the plurality of data levels of the time varying data signal;

a plurality of subsidiary data lines;

a demultiplexer including a plurality of switches each of which has a first end portion electrically connected to the the shared data line and a second end portion electrically connected to a corresponding one of the subsidiary data lines, wherein the subsidiary data lines respectively couple to respective ones of the plurality of sub-pixels so that respective data signal levels on the shared data line can be transferred sequentially and respectively from the shared data line to respective ones of the subsidiary data lines when respective ones of the demultiplexer switches are turned on for respective charge transfer periods; and a controller structured and operatively coupled to the plurality of demultiplexer switches for controlling the plurality of demultiplexer switches, the controller being configured to turn on the demultiplexer switch connected to the sub-pixel that receives the last of the sequentially transferred data signal levels for a charge transfer period that is longer than a sum of the other charge transfer periods allotted to the other demultiplexer switches of the plurality of demultiplexer switches, wherein the controller is coupled to the gate driver and the controller is configured to control the gate driver and to thereby cause the pulse-shaped gate signal to begin activating the sub-pixels of the pixel group during the last and longest charge transfer time.

2. The liquid crystal display according to claim 1, wherein the gate driver comprises a shift register formed on the display panel, and the shift register comprises a thin film transistor of low-temperature polycrystalline silicon.

3. The liquid crystal display according to claim 1, wherein each demultiplexer switch comprises low-temperature polycrystalline silicon.

4. The liquid crystal display according to claim 1, wherein each sub-pixel comprises a thin film transistor including amorphous silicon.

5. The liquid crystal display according to claim 1, wherein there are more than one pixel group, and each pixel group includes three sub-pixels.

6. The liquid crystal display according to claim 1, wherein the plurality of sub-pixels includes a first sub-pixel and a last sub-pixel, the last sub-pixel is the sub-pixel that receives the last of the sequentially transferred data signal levels, the plurality of demultiplexer switches includes a first demultiplexer switch and a last demultiplexer switch, the first demultiplexer switch is connected to the first sub-pixel, the last demultiplexer switch is the demultiplexer switch connected to the last sub-pixel, the charge transfer period is a time interval from when the last demultiplexer switch is turned on to when the last demultiplexer switch is turned off, and the last demultiplexer switch remains on during the charge transfer period.

7. A control method for controlling a liquid crystal display which comprises a plurality of pixel groups, with each pixel group including a plurality of sub-pixels, the liquid crystal display further having a gate driver structured to output a pulse-shaped gate signal that activates the sub-pixels of a correspondingly driven pixel group for a duration of the pulse-shaped gate signal, wherein the activation causes the respective sub-pixels to respond to respective data levels applied to the respective sub-pixels, a data driver structured to output a time varying data signal having a plurality of data levels and coupled to a shared data line that carries the plurality of data levels, and a demultiplexer having a plurality of demultiplexer switches each connecting the shared data line of the data driver to a plurality of subsidiary data lines, wherein the subsidiary data lines connect to corresponding sub-pixels of a given pixel group, the method comprising:

using the shared data line to sequentially apply a time varying data signal having a plurality of data levels to the demultiplexer;

controlling a demultiplexer switch connected to a last sub-pixel of the given pixel group, wherein the last sub-pixel receives a data signal level last within the given pixel group, and wherein the controlling causes the demultiplexer switch to be turned on for a last charge transfer period that is longer than a sum of the other charge transfer periods associated with the other demultiplexer switches of the plurality of demultiplexer switches of the demultiplexer, and controlling the gate driver to output an activating, pulse-shaped gate signal to the pixel group during the last and longest of the turn-on times of the plurality of demultiplexer switches.

8. The control method according to claim 7, wherein each pixel group comprises at least a first sub-pixel, a second sub-pixel, and a third sub-pixel arranged in a first direction, and wherein a first period of time when a corresponding first data signal level is applied to the subsidiary data line of the first sub-pixel and a second period of time when a corresponding second data signal level is applied to the subsidiary data line of the second sub-pixel is each shorter than the period of time when a corresponding third data signal level is applied to the subsidiary data line of the third sub-pixel.

9. The control method according to claim 7, further comprising controlling a first demultiplexer switch connected to a first sub-pixel of the given pixel group, wherein a last demultiplexer switch is the demultiplexer switch connected to the last sub-pixel of the given pixel group, the last charge transfer period is a time interval from when the last demultiplexer switch is turned on to when the last demultiplexer switch is turned off, and the last demultiplexer switch remains on during the last charge transfer period.

10. A method of transferring a charge from a demultiplexer to a plurality of sub-pixels in a pixel group, wherein each sub-pixel is operatively coupled to the demultiplexer by way of a respective thin film transistor and by way of a subsidiary data line corresponding to the respective thin film transistor, and wherein the to-be-transferred charge is supplied in the form of a timed one of time-multiplexed data signal levels, the method comprising:

during a first exclusive charge transfer period, transferring the charge corresponding to a first data level from the demultiplexer to a first subsidiary data line corresponding to a first of the sub-pixels;

during a second exclusive charge transfer period, transferring the charge corresponding to a second data level from the demultiplexer to a second subsidiary data line corresponding to a second of the sub-pixels;

during a last but not exclusive charge transfer period, transferring the charge corresponding to a last of data levels being supplied from the demultiplexer to the pixel group to a last subsidiary data line corresponding to a last of the sub-pixels in the group; and during the last but not exclusive charge transfer period, turning on the thin film transistors of all the sub-pixels in the pixel group so that charge is thereby transferred from the respective subsidiary data lines to the respective sub-pixels, wherein the last but not exclusive charge transfer period is longer than a sum of the first exclusive charge transfer period and the second exclusive charge transfer period.

11. The method of claim 10, wherein the last but not exclusive charge transfer period is a time interval from when a thin film transistor associated with the last of the sub-pixels is turned on to when a thin film transistor associated with the last of the sub-pixels is turned off, and the thin film transistor associated with the last of the sub-pixels remains on during the last but not exclusive charge transfer period.

* * * * *